United States Patent
Forsberg et al.

(10) Patent No.: US 8,145,195 B2
(45) Date of Patent: Mar. 27, 2012

(54) MOBILITY RELATED CONTROL SIGNALLING AUTHENTICATION IN MOBILE COMMUNICATIONS SYSTEM

(75) Inventors: Dan Lars Anders Forsberg, Helsinki (FI); Valtteri Niemi, Helsinki (FI)

(73) Assignee: Nokia Corporation, Espoo (FI)

(*) Notice: Subject to any disclaimer, the term of this patent is extended or adjusted under 35 U.S.C. 154(b) by 1011 days.

(21) Appl. No.: 12/081,306

(22) Filed: Apr. 14, 2008

(65) Prior Publication Data

US 2009/0258631 A1   Oct. 15, 2009

(51) Int. Cl.
H04M 1/66   (2006.01)

(52) U.S. Cl. ..... 455/411; 455/436; 455/440; 455/456.1; 370/331; 380/247

(58) Field of Classification Search .......... 455/411, 455/436–440; 370/331; 380/247–250
See application file for complete search history.

(56) References Cited

U.S. PATENT DOCUMENTS

| | | | | |
|---|---|---|---|---|
| 6,937,862 | B2 * | 8/2005 | Back et al. | 455/445 |
| 7,020,455 | B2 * | 3/2006 | Krishnarajah et al. | 455/410 |
| 7,783,299 | B2 * | 8/2010 | Anderson et al. | 455/456.1 |
| 2008/0039096 | A1 | 2/2008 | Forsberg | |

OTHER PUBLICATIONS $3^{rd}$ Generation Partnership Project; Technical Specification Group Services and System Aspects; General Packet Radio Service (GPRS) enhancements for Evolved Universal Terrestrial Radio Access Network (E-UTRA access (Release 8), pp. 1-168, 3GPP TS 23.401 V8.1.0, Mar. 2008.

$3^{rd}$ Generation Partnership Project; Technical Specification Group Radio Access-Network; Evolved-Universal Terrestrial Radio Access (E-UTRAN) and Envolved Universal Terrestrial Radio Access Network (E-UTRA); Overall description; Stage 2 (Release 8), pp. 1-214, 3GPP TS 36.300 V8.40, Mar. 2008.

$3^{rd}$ Generation Partnership Project; Technical Specification Group Services and System Aspects; General Packet Radio Service (GPRS); Service description; Stage 2 (Release 8), pp. 1-214, 3GPP TS 23.060 V8.0.0, Mar. 2008.

U.S. Appl. No. 11/964,656, filed Dec. 26, 2007, Dan Forsberg, Method of Handoff.

U.S. Appl. No. 60/983,450, filed Oct. 29, 2007, Marc Blommaert et al., System and Method for Authenticating a Context Transfer From MME Towards a Legacy 3GPP System.

SA WG3 Temporary Document, 3GPP TSG SA WG190 Security—S3#49bis, NAS Security with P-TMSI signature, Dec. 11-13, 2007, a total of 3 pages.

3GPP TSG SA WG3 Security-SA3#46b, S3-070234, Sophia Antipolis, Mar. 28-29, 2007, Nokia, Siemens Networks, Key refresh in SAE/LTE, XP002445697, pp. 5-6, figure 6.

3GPP TR 33.821 V1.0.0. (Dec. 2007); $3^{rd}$ Generation Partnership Project; Technical Specification Group Services and System Aspects; Rationale and track of security decisions in Long Term Evolved (LTE) Ran/3GPP System Architecture Evolution (SAE) (Release 8).

* cited by examiner

*Primary Examiner* — Temica M Beamer
(74) *Attorney, Agent, or Firm* — Harrington & Smith

(57) ABSTRACT

In a non-limiting and exemplary embodiment, a method is provided for arranging authentication of mobility related signalling messages in a mobile communications system. An authentication code is generated on the basis of a previous authentication code stored in connection with a preceding authentication code generation event. The newly generated authentication code is stored for subsequent authentication code generation event. In response to change of the mobile device to an access network of the network entity, a control message comprising the authentication code is transmitted from a mobile device to a first network entity, for verifying the authentication code by the first network entity or by a second network entity of a previous access system.

37 Claims, 5 Drawing Sheets

MOBILITY RELATED CONTROL SIGNALLING AUTHENTICATION IN MOBILE COMMUNICATIONS SYSTEM

FIELD

The invention relates to arranging authentication of mobility related signalling messages in a mobile communications system.

BACKGROUND

This section is intended to provide a background or context to the invention that is recited in the claims. The description herein may include concepts not known to the relevant art prior to the present invention. Therefore, unless otherwise indicated herein, what is described in this section is not prior art to the description and claims in this application and is not admitted to be prior art by inclusion in this section.

In mobile communications systems "handoff" or "handover" refers to user equipment changing from a source base station to a target base station. There are different types of handovers: The user equipment may change to another radio cell, another base station, another core network, or even another radio technology. There are certain security issues related to arranging mobility related control signalling.

In certain mobility situations, mobile device related information, also referred to as user equipment context information, needs to be requested by a handover target network element from a source network element. In the Universal Mobile Telecommunications System (UMTS) including a Universal Terrestrial Radio Access Network (UTRAN), a packet switched network temporary mobile station identifier (P-TMSI) signature is used to authorize the transfer of user equipment context information between network entities of a single system or between network entities of different systems when a serving General Packet Radio Service (GPRS) support node (SGSN) changes. Thus, the old SGSN can verify that the context transfer request from the new SGSN is valid and relates to the corresponding user equipment.

However, in the evolved 3GPP system, also referred to as the long-term evolution (LTE) of the UMTS UTRAN or the 3.9G, where the radio access network is referred to as Evolved UTRAN (E-UTRAN), the P-TMSI signature is not expected to be used. Instead, non-access stratum (NAS)-level security association and corresponding keys and COUNT values are managed during the IDLE mode, and all NAS-level signaling is authenticated (by integrity protection) with the NAS keys. Therefore, during inter-Mobility Management Entity (MME) mobility, the old MME authenticates the context transfer request and mobility signaling based on a NAS message authentication code (MAC).

To arrange handover between a legacy 3GPP UTRAN and the E-UTRAN, it has been proposed to use a NAS token generated on the basis of NAS keys and a sequence number for arranging authentication of a context transfer request from an SGSN of the legacy 3GPP system. The NAS token freshness must be guaranteed. However, the use of the sequence number provides NAS token freshness only as long as NAS messages are exchanged between two consecutive E-UTRAN to UTRAN idle handovers. An attacker could replay the NAS token under some other SGSN before any new E-UTRAN level NAS messages are sent from the user equipment to the MME.

BRIEF DESCRIPTION

Methods, apparatuses, and a computer program readable mediums are now provided, which are characterized by what is stated in the independent claims. Some embodiments of the invention are described in the dependent claims.

According to an aspect of the invention, an authentication code is generated on the basis of a previous authentication code stored in connection with a preceding authentication code generation event. The newly generated authentication code is stored for subsequent authentication code generation event. In response to an access network change for the mobile device, due to mobility of the mobile device, a control message comprising the authentication code is transmitted from a mobile device to a first network entity, for verifying the authentication code by the first network entity or by a second network entity of a previous access system.

It is to be noted that the functionality may be applied for various types of handovers and connection area updates, such as routing or location area updates. Hence, the transmission of the control message comprising the authentication token to the first network entity in response to an access network change of the mobile device is to be broadly understood to cover also intra-access network change, where the mobile device may only change base station or cell but otherwise remain connected to the access network. According to another aspect, an authentication code generated on the basis of a previous authentication token is used when authenticating or authorizing a received control message including an authentication code from a mobile device in response to an access network change for the mobile device.

According to another aspect, after an authentication code is generated on the basis of a previous authentication code stored in connection with a previous authentication code generation event, a first control message comprising the authentication code is transmitted from a mobile device to a first network entity due to change of the mobile device to an access system of the first network entity. The first control message is received at the first network entity and a second control message is transmitted to a second network entity, the second control message including the authentication code as received from the mobile device. The second control message is authenticated on the basis of verification of the received authentication code.

The invention and various embodiments of the invention provide several advantages, which will become apparent from the detailed description below. One advantage of embodiments is that it becomes possible to improve the security level by better ensuring freshness of the authentication code.

LIST OF DRAWINGS

Embodiments of the present invention are described below, by way of example only, with reference to the accompanying drawings, in which FIG. 1 illustrates a communications system according to an embodiment;

Figure 6:
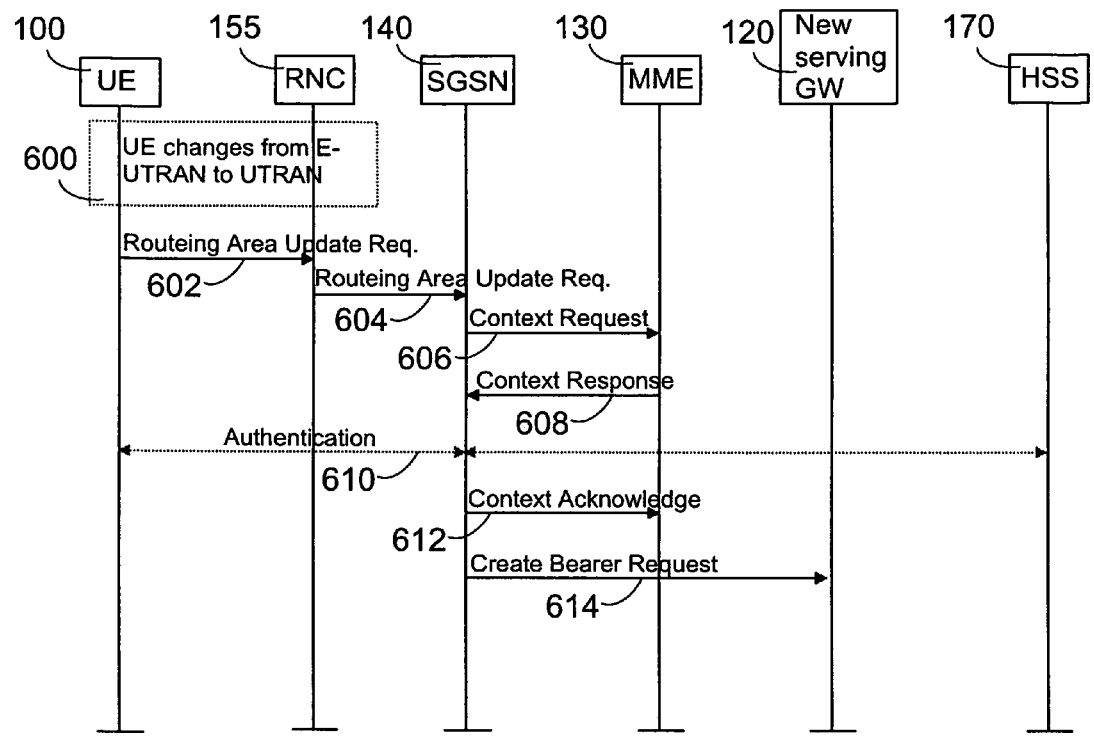
Figure 7:
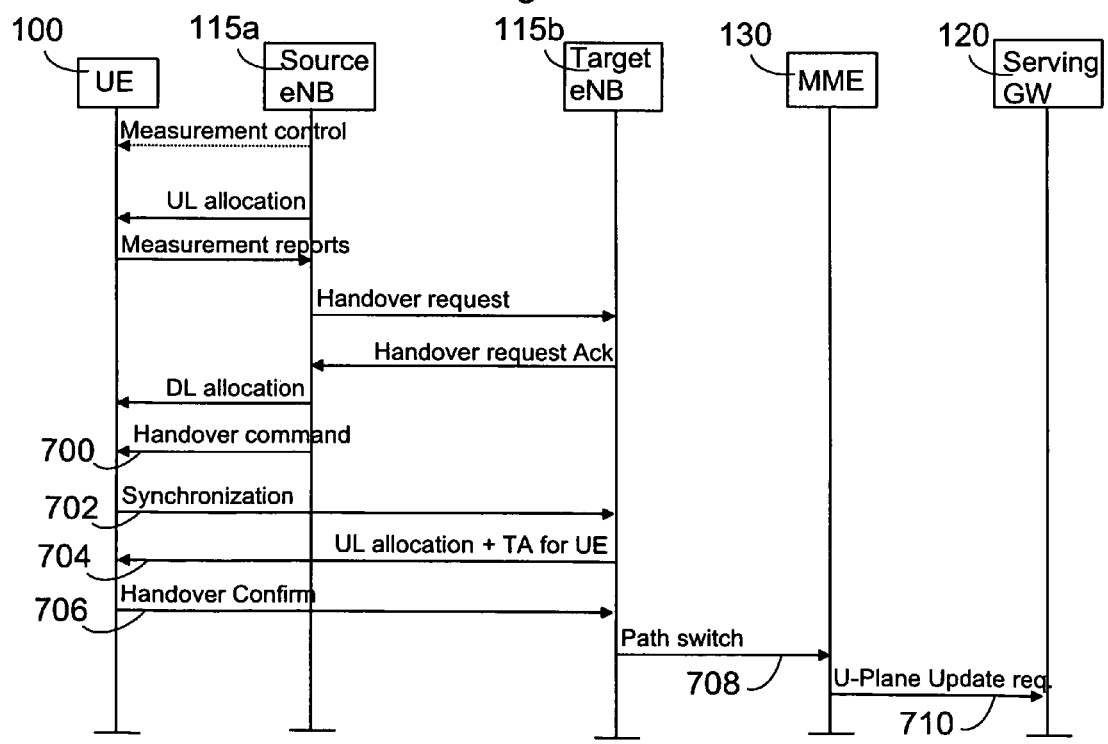
Figure 8:
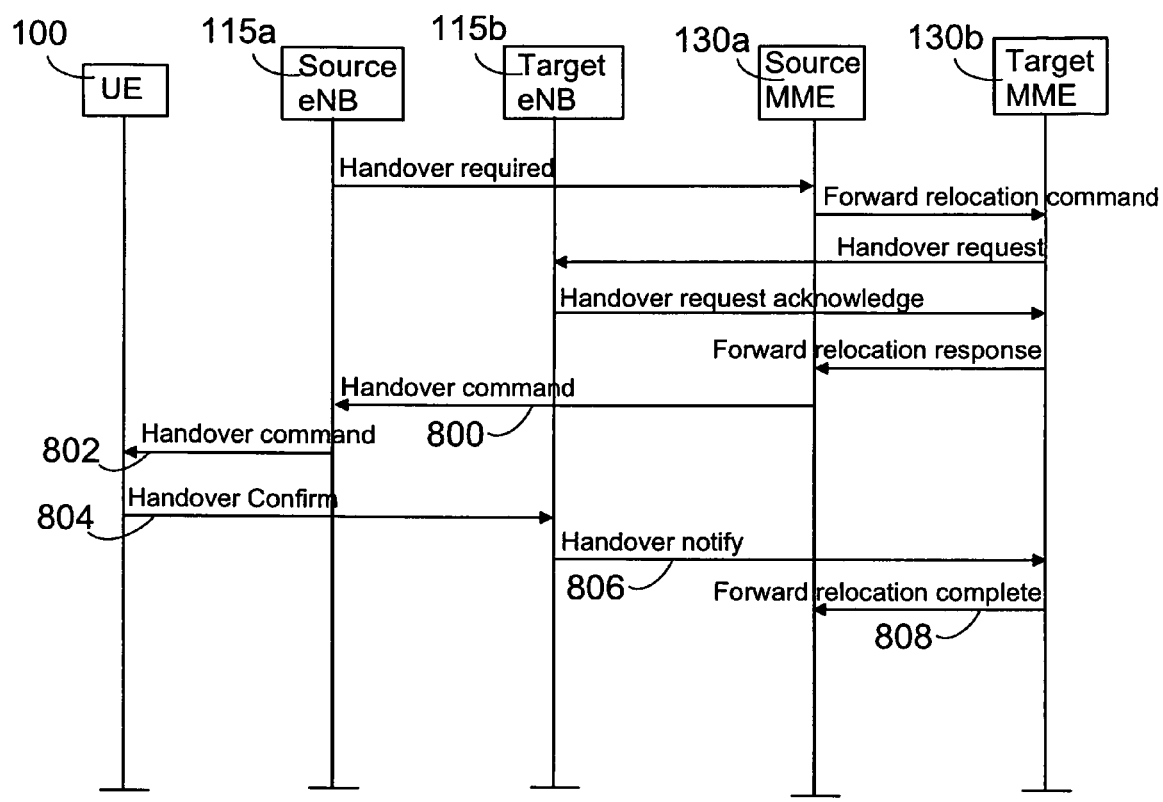

FIGS. 6, 7, and 8 illustrate signaling diagrams according to some embodiments.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

An embodiment of the invention will be illustrated in the following with reference to the 3GPP communications system in FIG. 1. However, the application of the invention is not limited to any particular network configuration but embodiments of the invention can be applied to any communication system where the control messages due to mobility of a user terminal need to be authenticated.

Figure 1:
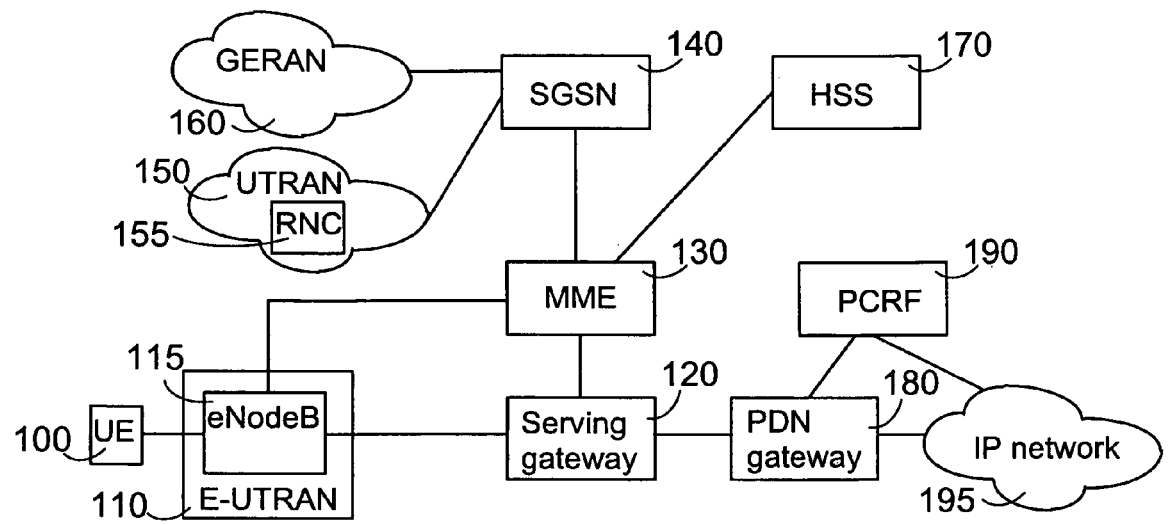

FIG. 1 is a representation of a roaming architecture for the interoperation of early 3GPP standards releases and the UTRAN LTE. As shown in FIG. 1, user equipment 100 interacts with an E-UTRAN 110 comprising one or more eNodeBs 115. The eNodeB 115 is arranged to communicate over an S1_U interface with a serving gateway (SGW) 120 and over an S1_MME interface with an MME 130. In addition to communicating with the SGW 120 directly, the MME 130 is also arranged to communicate with an SGSN 140, which is connected to both a UTRAN 150 with one more NodeBs and radio network controllers RNC 155 and a GSM/Edge Radio Access Network (GERAN) 160. Both the MME 130 and the SGSN 140 also interact with a home subscriber server (HSS) 170. Both the SGSN 140 and the SGW 120 communicate with a packet data network (PDN) gateway 180, which in turn communicates with both a policy charging rule function (PCRF) 190 and IP network services 195. Further information on the 3GPP LTE system and references to legacy 3GPP system specifications are available in 3GPP technical specification TS23.401.

In accordance with an embodiment, an authentication code, also below referred to as generally an authentication token or an enhanced NAS token for 3GPP LTE, generated on the basis of an authentication code of a previous authentication code generation event, is included in a location update or handover related control message from the UE 100 after changing to a new access network. The authentication code is forwarded by a network element of or connected to the new access network to the MME 130 for verification purposes to enable the MME 130 to authenticate or authorize the message from the network element. For instance, dependent on the mobility situation, the network element forwarding the authentication code may be the RNC of UTRAN 150, the SGSN 140, the eNodeB of the E-UTRAN 110, or another MME (source MME).

Figure 2A:
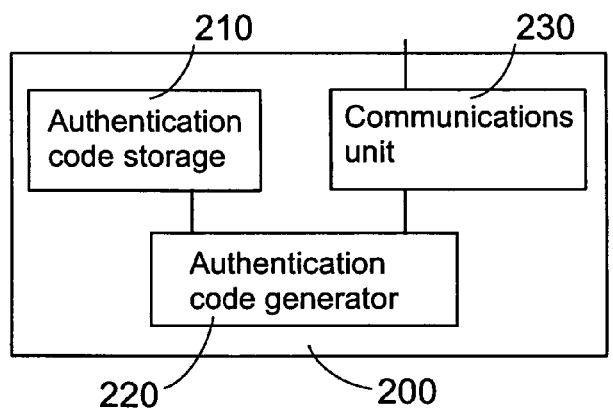
FIGS. 2a and 2b illustrate apparatuses according to an embodiment.

FIG. 2a illustrates a simplified block diagram of an apparatus 200 according to an embodiment. The apparatus 200 comprises a storage 210 for storing authentication codes, an authentication code generator 220 generating an authentication code on the basis of a previous authentication code stored in the storage 220 in connection with a previous authentication code generation event, and a communications unit or communicator 230, for instance a wireless transmitter or transceiver for transmitting the authentication code in a handover or location update related control message to a network entity of a new access network or connected to a new access network of the apparatus 200.

Figure 2B:
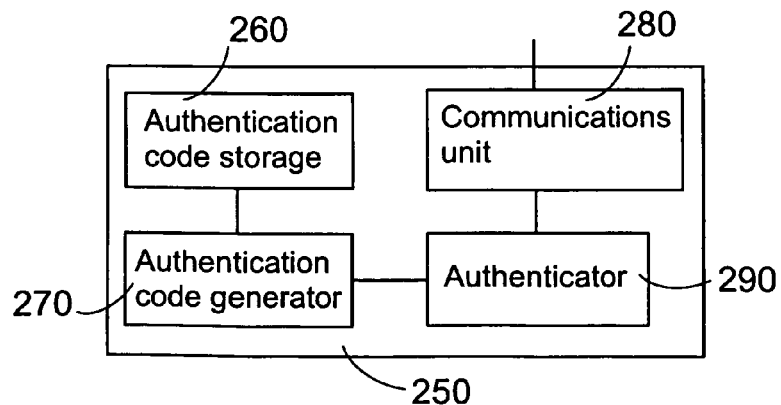

FIG. 2b illustrates a simplified block diagram of an apparatus 250 according to an embodiment. The apparatus 250 comprises storage 260 for storing authentication codes and an authentication code generator 270 generating an authentication code on the basis of a previous authentication code stored in the storage 260 in connection with a previous authentication code generation event. Further, the apparatus 250 comprises a communications unit or communicator 280 for receiving a handover or location update related control message including an authentication code and a verification unit or an authenticator 290 for verifying the received authentication code on the basis of comparison to an authentication code generated in the apparatus 250.

Some further embodiments of features for the apparatuses 200, 250 and for the modules of the apparatuses 200, 250 are illustrated below in connection with FIGS. 3 to 6. It should be appreciated that the apparatus 200, 250 may comprise other units. However, they are irrelevant to the present embodiments and, therefore, they need not to be discussed in more detail here.

The apparatus 200 may be any type of computing device with communications capabilities, such as the UE 100 roaming between access networks. The apparatus 250 may be any type of network apparatus, such as the MME 130 of a 3GPP LTE system. However, besides an apparatus in accordance with 3GPP LTE specifications, the present features can be applied in apparatuses in accordance with other current or future mobile communications specifications.

Although the apparatus 200, 250 has been depicted as one entity, different modules and memory may be implemented in one or more physical or logical entities. Although the modules depicted in FIGS. 2a and 2b are functionally separated, at least some of these functions could be implemented in a single unit or module. Further, there could be an apparatus implementing only one of these units. A controller controlling presently disclosed authentication code related functions in apparatus 200 or 250 is to be broadly understood to be realized by a single logical or physical control unit or a plurality of such control units.

The apparatus could be in a form of a chip unit or some other kind of hardware module for controlling a data processing device. Such hardware module comprises connecting means for connecting the data processing device mechanically and/or functionally. Thus, the hardware module may form part of the device and could be removable. Some examples of such hardware module are a sub-assembly or an accessory device. For instance, all or some of the modules in FIG. 2a or 2b, such as the modules 220, 230 of apparatus 200 and modules 270, 280, 290 for apparatus 200 could form one or more physical entities operationally connectable to other modules of FIG. 2. For instance, such apparatus may be a chipset or an integrated circuit suitable for use in a mobile station or a portable computer.

The apparatus 200, 250 may be implemented as an electronic digital computer, which may comprise memory, a central processing unit (CPU), and a system clock. The CPU is controlled by a sequence of program instructions transferred to the CPU from the memory.

An embodiment provides a computer program embodied on a data storage medium, comprising computer program code which, when loaded into an electronic apparatus, constitute one or more of the modules in FIGS. 2a and 2b. Such computer-readable medium can be any media or means that can contain, store, communicate, propagate or transport the instructions for use by or in connection with an instruction execution system, apparatus, or device. Such computer program may include program code for controlling the apparatus 200 to perform at least some of the functions illustrated below in connection with FIGS. 3a, 3b, 4, and UE related features described in connection with FIGS. 6, 7, and 8. A computer program code may be stored on a computer-readable medium for controlling the apparatus 250 to perform at least some of the functions illustrated in FIGS. 3a, 3b, 5, and MME related features described in connection with FIGS. 6, 7, and 8. The computer program may be in source code form, object code form, or in some intermediate form, and it may be stored in some carrier, which may be any entity or device capable of carrying the program. Such carriers include a record medium, computer memory, read-only memory, electrical carrier signal, telecommunications signal, and software distribution package, for example.

At least some of the modules of the apparatus 200, 250 may also be implemented as one or more integrated circuits, such as application-specific integrated circuits ASIC. Other hardware embodiments are also feasible, such as a circuit built of separate logic components. A hybrid of these different implementations is also feasible. The software and/or hardware may reside on a chipset, a mobile device, a desktop, a laptop or a server, for instance.

Figure 3A:
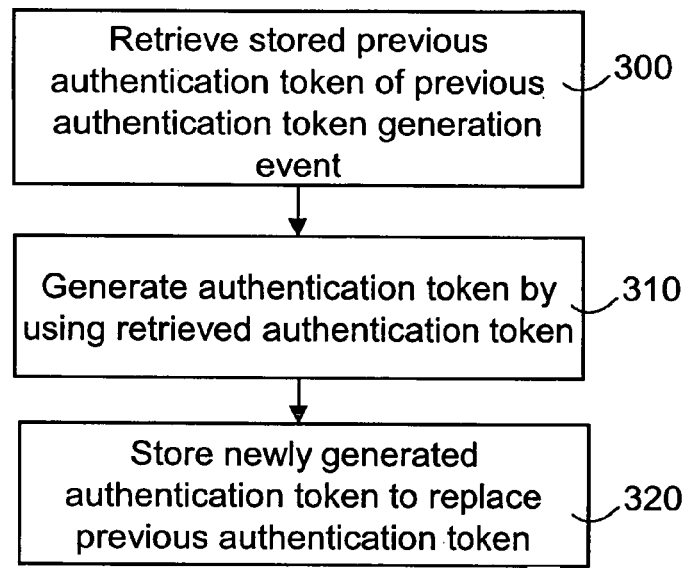
FIGS. 3a and 3b illustrate methods according to embodiments.

FIG. 3a illustrates an authentication token generation method according to an embodiment. In step 300 a pre-stored authentication token of a previous authentication token generation event is retrieved. In step 310 an authentication token is generated by using the retrieved authentication token and user-specific keying material. In step 320, the newly generated authentication token is stored (in storage 230, 260) to replace the previously stored authentication token.

Figure 3B:
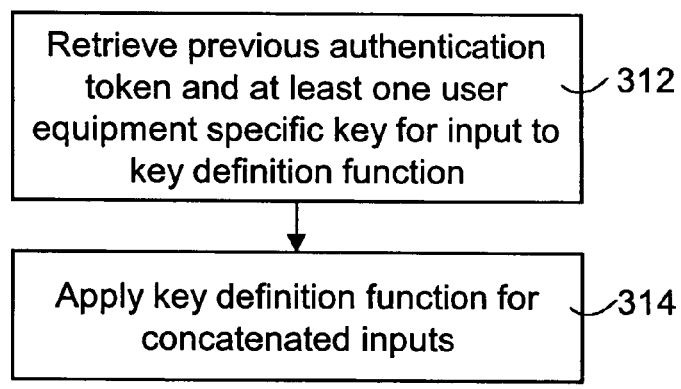

FIG. 3b illustrates one embodiment for generating the authentication token, which may be applied in step 310. In step 312 the retrieved authentication token is concatenated with a user equipment specific key. In step 314 a key definition function is applied for the concatenated inputs to generate the authentication token.

In one embodiment, the user equipment specific key is or is derived from a non-access stratum (NAS) key. For 3GPP LTE system, the authentication token may be referred to as the enhanced NAS token.

In one embodiment the previously stored NAS token is concatenated 312 with an access security management entity key $K_{ASME}$ used as a root key from which NAS keys are derived. In one embodiment, the enhanced NAS token is calculated as shown below:

NAS-token$_0$=KDF($K_{ASME}$∥0 . . . 0∥"NAS-token")

NAS-token$_1$=KDF($K_{ASME}$∥NAS-Token$_0$∥"NAS-token")

NAS-token$_i$=KDF($K_{ASME}$∥NAS-Token$_{i-1}$∥"NAS-token")

In the above, KDF is a key derivation function and $K_{ASME}$ is the access security management entity key. ∥ denotes concatenation, and the string within the hyphens (" ") is a constant. It is to be noted that other parameters can be additionally or instead of the above listed ones used as inputs in authentication token generation. Hence, the present authentication token generation method is not limited to any specific input parameters, but any suitable input parameters may be used for generating the authentication token based on a previously generated authentication token.

For instance, other user specific keying material may be used as an input to the key definition function for generating the authentication token in step 310. For instance, other NAS keys may be used. In one embodiment NAS integrity K_NASInt and/or NAS ciphering key K_NASenc is/are used for generating the authentication token. NAS keys are further defined in TS33.abc. However, it is to be noted that it is not necessary to use any NAS key for generating the enhanced NAS token.

A reference is also made to the features for arranging generation and use of NAS tokens disclosed in an earlier provisional U.S. patent application No. 60/983,450, which is incorporated herein in the present application in its entirety and may be applied in the present embodiments. However, when the presently disclosed chaining of NAS tokens is applied instead of the use of the NAS sequence numbers or (uplink or downlink) count values, a number of advantages are available. It is not required to have an event or NAS sequence number increase before refreshing the NAS token, but every NAS token is fresh. Hence, a first NAS token after authentication and key agreement (AKA) can be generated only when it is actually needed. NAS token creation can be made independently from any synchronized event or NAS sequence number handling, and independently from the NAS keys.

Further, system complexity and possible errors in updating the NAS uplink or downlink count can be avoided and no end-to-end NAS message exchange is required between UE 100 and MME 130.

The present features allow on-the-fly generation of the first NAS token in UE 100 and MME 130. Usage of the enhanced NAS token would automatically set the NAS-token to the next value. This would make the NAS token handling simpler compared to NAS uplink COUNT bound pre-allocated NAS-token as then MME does not need to mark the NAS token "used" or "delete" and wait for the next event or NAS message that would allow creating a new NAS token. In case the NAS token validation fails (error case), the AKA can be run to authenticate the user. In one embodiment an apparatus generating the authentication token chain is arranged to move forward in the authentication token chain for error detection purposes. In a 3GPP LTE system, the MME 130 may be arranged to move forward NAS token chain in a case of synchronization problem between UE 100 and MME 130 to detect if some NAS-tokens were lost in the chain. For example, the MME 130 can go forward the chain 3 steps and if no matching token is found, revert to the original position of the token chain.

Figure 4:
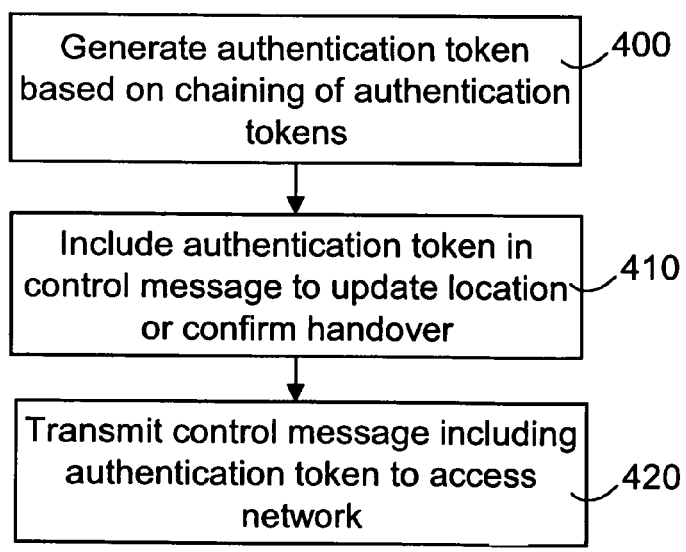
FIG. 4 illustrates a method according to an embodiment.
Figure 5:
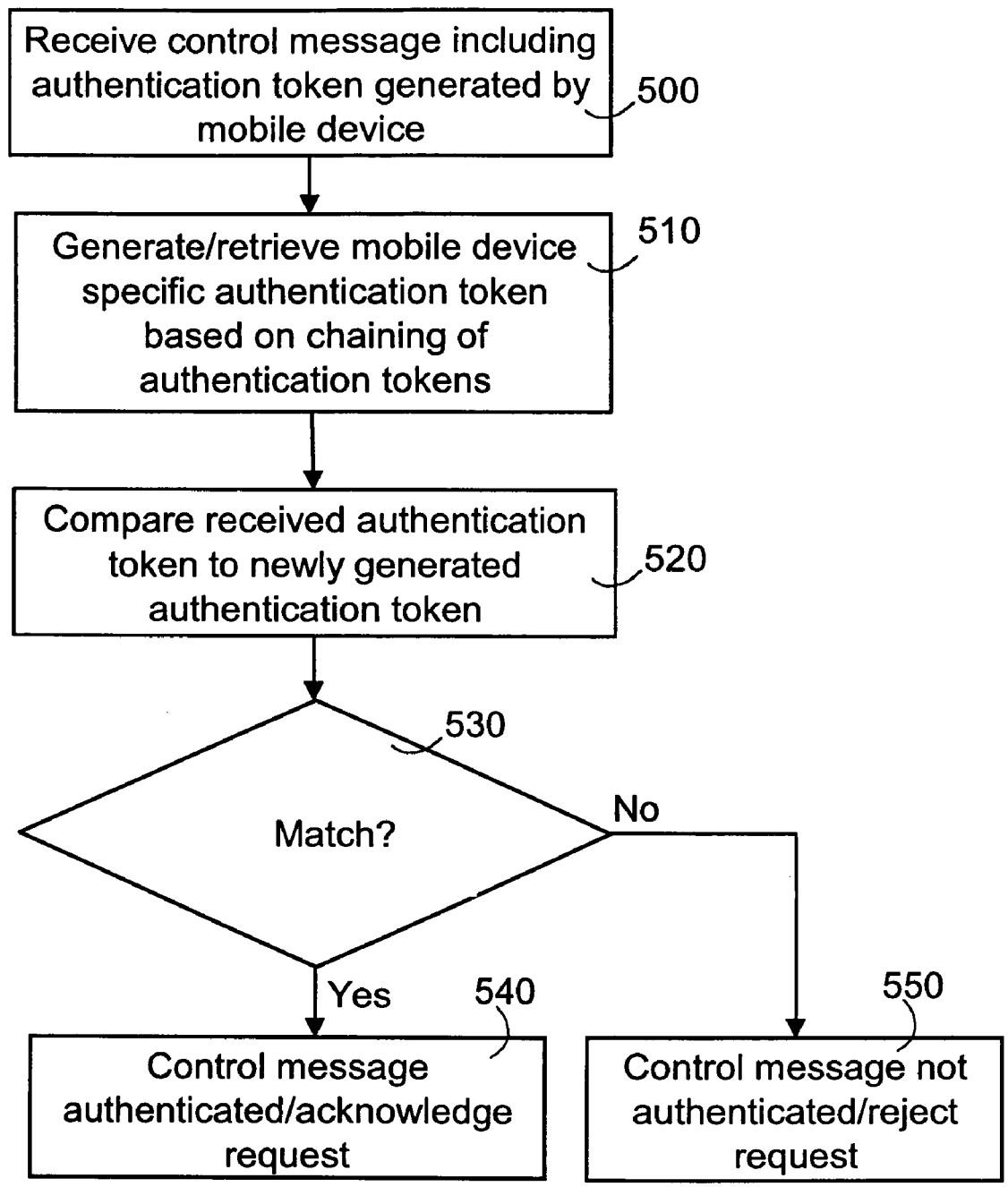
FIG. 5 illustrates a method according to an embodiment.

Next, let us study further use of the authentication token generated on the basis of the above illustrated method, first by generalized flow diagrams of FIGS. 4 and 5 and then further in 3GPP LTE system.

FIG. 4 is a flow diagram illustrating method according to an embodiment. The method may be applied in a mobile device, such as the UE 100. In step 400 an authentication token is generated based on chaining of authentication tokens. The above illustrated embodiments may be applied in step 400. In step 410 the newly generated authentication token is included in a control message to update the location of the mobile device or to confirm a handover for the mobile device, i.e. after the mobile device has entered a new access network area. In step 420 the control message is transmitted to a new access network in case of inter-access network change or to a new cell within the access network in case of intra-access network change. For instance, in case of E-UTRAN, the control message including the authentication token may be transmitted to a new eNodeB or a new cell within the already connected eNodeB.

FIG. 5 illustrates a method according to an embodiment. The method may be applied in a network element controlling mobility management for a mobile device, such as the MME 130. In step 500 a control message including an authentication token generated by the mobile device is received. In step 510 a mobile device specific authentication token may be generated based on concatenation of authentication tokens. Alternatively, the authentication token may be already generated beforehand priority step 500, whereby the already generated authentication token is retrieved from memory (260). It is to be also noted that the newly generated authentication token is also stored as explained earlier (step 320 of FIG. 3a), before or after the comparison 520, 530.

In step 520, 530 the received authentication token is compared to the newly generated authentication token. If there is a match, the authentication token of the control message is verified and the control message is authenticated. Thus, the control message may be acknowledged and a response may be issued for the request included in the control message. If there is not a match, the authentication token cannot be verified and the control message is not reliable. Thus, the procedure cannot be continued as requested.

Some further embodiments for using the enhanced NAS token for location update and handover control signalling authentication purposes are illustrated in further detail below for evolved 3GPP system.

FIG. 6 is a signalling chart showing an MME to SGSN routing area update procedure according to various embodiments. In certain embodiments, the messages from and to the SGSN, as well as the information elements contained therein, are the same as specified in 3GPP Technical Specification (TS) 23.060 v.8.0.0 for the SGSN routing area update procedure. The messages from and to the MME 130 or the SGW 120, as well as the information elements contained therein, are the same as specified in 3GPP TS 23.401 for the E-UTRAN to UTRAN routing area update procedure, this specification being included herein as a reference in its entirety.

The MME to SGSN routing area update procedure begins after step 600 when the user equipment UE 100 has changed from E-UTRAN to UTRAN. In step 602, the UE 100 sends a routeing area update request to a new SGSN 140. The routing area update request 602 includes information such as the old routing area identification (RAI), the old P-TMSI signature, and the user equipment's/mobile station's network capability information. The user equipment 100 indicates Globally Unique MME Identifier (GUMMEI) as the old RAI and calculates a NAS token based on the previous NAS token, as already illustrated, and includes the newly calculated NAS token as the old P-TMSI signature in the request 602. The RNC 155 adds a new routing area identity to the received message before passing the message 604 to the new SGSN 140.

At 606 in FIG. 2, the new SGSN 140 sends a context request to the old MME 130 in order to obtain the mobility management (MM) and packet data protocol (PDP) contexts for the user equipment 100. The new SGSN 140 uses the GUMMEI to derive the MME address. This message includes the P-TMSI signature field including the NAS token.

The old MME 130 parses the P-TMSI signature field value and verifies the NAS token by applying the procedures as already illustrated. The old MME 130 responds with an appropriate error cause if the received NAS token does not match the value calculated in the old MME 130. The MME 130 does not update the location as requested and/or may initiate an AKA procedure for the UE 100.

If the NAS token can be verified, the old MME 130 may authorize the request and send a context response (MME Context) at 608 back to the new SGSN 140. PDP contexts, PDN GW address, and Serving GW address are part of the MME Context. The old MME maps the evolved packet system EPS bearers to packet data protocol PDP contexts.

Security functions 610 may then be initiated by the new SGSN 140. The new SGSN 140 sends a context acknowledge message 612 to the old MME 130. Although not shown in FIG. 6, the location update and routing area update related features may be continued as specified in section E-UTRAN to UTRAN routing area update procedure of the 3GPP TS23.401, see the messages 6-22.

The enhanced NAS token may be applied also in connection with other location area related control signaling. In one embodiment, similarly to the above illustrated E-UTRAN to UTRAN change, in one embodiment the enhanced NAS token is used for authenticating control signaling related to an E-UTRAN to GERAN A/Gb mode routing area update. Thus, the UE 100 would include the NAS token in a P-TMSI signature of a routing area update request. The SGSN 140 includes the NAS token in a context request to the MME 130. The MME may verify the NAS token proceed in accordance with the result of the verification. For further information on E-UTRAN GERAN RAU is available in section "E-UTRAN to GERAN Routeing Area Update" of the 3GPP TS23.401.

In one embodiment, the presently disclosed authentication token, generated based on chaining of authentication tokens, is applied after handover of a mobile device, to arrange authentication for control signaling messages from the new access/core network. The handover may involve change of a radio access network or base station, change of radio access technology (RAT), and/or change of a core network element, such as the MME 130, for instance. In a UTRAN LTE embodiment, the enhanced NAS token may thus be included in a handover complete or confirmation message from the UE 100, and further in a relocation complete message, a forward relocation complete message, or a handover notify message.

In one embodiment the enhanced NAS token is used for authenticating control signaling related to an inter eNodeB handover (with or without MME relocation). In this embodiment the UE 100 may include the NAS token in Handover Confirm message. Thus, the target eNodeB 115 receives the token and forwards it in a Handover Notify to the target MME 130. In case of inter-MME handover, the target MME 130 forwards the token to a source MME in a Forward Relocation Complete. The source MME 130 (or in case of intra-MME handover, the MME receiving the Handover Notify) may then verify the received NAS token and authenticate the Forward Relocation Complete (or the Handover Notify), and control transmission of the Forward Relocation Complete Acknowledgement in accordance with the result of the verification.

In another embodiment the received NAS token is used only during the Tracking Area Update TAU procedure after the handover has been executed towards the E-UTRAN 150. The UE 100 may include the NAS token into a Tracking Area Update Request to the MME 130 and the features already illustrated above for verifying the NAS token may be applied in the MME 130. The reason to use NAS token is that the target MME 130 and UE 100 may not have an agreed algorithm for integrity protection. The MME 130 may proceed with the tracking area update in response to successful verification of the NAS token. By these embodiments, the UE's 100 location update towards the MME 130, which is to be generally understood to encompass also the tracking area update and part of the second security layer, can be now authenticated and authorized with the second layer security between UE 100 and MME 130. The present solution is applicable in the present evolved 3GPP architecture and is not complex to specify and implement.

In one embodiment, the enhanced NAS token is used for authenticating control signaling related to an E-UTRAN to UTRAN handover. In this embodiment the UE 100 may include the NAS token in a Handover to UTRAN Complete message. Thus, the RNC 155 receives the token and forwards it to the SGSN 140 in a Relocation Complete. The SGSN 140 forwards the token to a source MME 130 in a Forward Relocation Complete. The MME 130 may then verify the received NAS token and authenticate the Forward Relocation Command, and control transmission of the Forward Relocation Command Acknowledgement in accordance with the result of the verification.

In another embodiment the received NAS token is used only during the RAU procedure after the handover has been executed. The UE 100 may include the NAS token in a Routing Area Update Request after handover execution and the features already illustrated in connection with FIG. 6 may be applied.

Similarly to the above illustrate E-UTRAN to UTRAN handover, the enhanced NAS token may be used in connection with E-UTRAN to GERAN A/Gb mode Inter RAT handover. For further information on E-UTRAN GERAN RAU is available in section "E-UTRAN to GERAN A/Gb mode Inter RAT HO" of the 3GPP TS23.401.

In another embodiment, as illustrated in simplified FIGS. 7 and 8, the enhanced NAS token is used for authenticating control signaling related to an E-UTRAN to E-UTRAN system handover, i.e. intra E-UTRAN system handover. FIG. 7 illustrates intra MME handover and FIG. 8 inter MME handover. After handover preparation steps, a handover command 700, 800/802 is submitted to the UE 100. The UE 100 may then perform various handover related tasks, such as steps 702 and 704, not illustrated in further detail. The UE 100 may then generate the enhanced NAS token and include the NAS token in a Handover to UTRAN Complete message or Handover Confirm message 706, 804 to the target eNodeB. Thus, the target eNodeB receives the token and forwards it to the MME in a path switch message 708 or Handover notify 806 message. The MME 130 may then verify the received NAS token and authenticate the received message and control transmission of the U-plane Update Request message 710 or the Forward Relocation command message 808 accordingly. For further information on the intra MME and inter MME handovers, a reference is made to Chapter 10.1.2 of 3GPP TS 36.300 v. 8.4.0 and Chapter "*Inter eNodeB handover without MME relocation*" of TS 23.401 v. 8.1.0, respectively.

It will be obvious to a person skilled in the art that, as technology advances, the inventive concept can be implemented in various ways. The invention and its embodiments are not limited to the examples described above but may vary within the scope of the claims. The features of the embodiments described herein may be combined in all possible combinations of methods, apparatuses, modules, systems, and computer program products. The combinations of claim elements as stated in the claims can be changed in a number of different ways and still be within the scope of various embodiments of the invention.

The invention claimed is:

1. A method comprising:
    transmitting a first control message from a mobile device to a first network entity due to change of the mobile device to an access system of the first network entity, the control message comprising an authentication code,
    receiving the first control message at the first network entity,
    transmitting a second control message to a second network entity, the second control message including the authentication code as received from the mobile device, and
    authenticating the second control message on the basis of verification of the received authentication code,
    wherein the authentication code is generated on the basis of a previous authentication code stored in connection with a previous authentication code generation event;
    and further comprising padding a value of the previous authentication code in response to no previous authentication code being stored.

2. The method according to claim 1, wherein the first message is a location update request message.

3. The method according to claim 2, wherein the second message is a context transfer request, further comprising:
    transferring a requested context to the first network entity in response to successful verification of the authentication code.

4. The method according to claim 1, wherein the first message is a handover complete or confirmation message.

5. The method according to claim 4, wherein the second message is one of a relocation complete message, a forward relocation complete message, or a handover notify message.

6. The method of claim 1, wherein the first network entity is a network element of one of a legacy $3^{rd}$ Generation Partnership (3GPP) Universal Mobile Telecommunications System (UMTS) system and a legacy 3GPP General Packet Radio Service (GPRS), and wherein the second network entity is a network element of an evolved 3GPP system.

7. The method of claim 6, wherein the first network entity is one of a radio network controller, a serving general packet radio service support node SGSN, an eNodeB, or a mobility management entity MME, and the second network entity is an MME.

8. The method of claim 1, wherein the authentication code is included in a packet switched network temporary mobile station identifier (P-TMSI) signature information field.

9. The method of claim 1, wherein the authentication code is a non-access stratum token derived from a previous non-access stratum token and a user equipment specific non-access stratum key.

10. The method of claim 1, wherein the authentication code is derived from concatenation of a previous non-access stratum token and an access security management key.

11. A method comprising:
    generating an authentication code on the basis of a previous authentication code stored in connection with a preceding authentication code generation event,
    storing the generated authentication code for subsequent authentication code generation event, and
    transmitting a control message comprising the authentication code from a mobile device to a first network entity in response to an access network change for the mobile device, for verifying the authentication code by the first network entity or by a second network entity of a previous access network;
    further comprising padding a value of the previous authentication code in response to no previous authentication code being stored.

12. The method according to claim 11, wherein the message is included in one of a location update request message, a tracking area update request message, a routing area update request message, a handover complete, or a handover confirmation message.

13. The method according to claim 11, wherein the authentication code is included in a packet switched network temporary mobile station identifier (P-TMSI) signature information field.

14. The method of claim 11, wherein the authentication code is a non-access stratum token derived from a previous non-access stratum token and a user equipment specific non-access stratum key.

15. A method comprising:
    generating an authentication code on the basis of a previous authentication code stored in connection with a preceding authentication code generation event,
    storing the generated authentication code for subsequent authentication code generation event, and using the generated authentication code when authenticating or authorizing a received control message including an authentication code from a mobile device in response to an access network change due to mobility of the mobile device;
further comprising padding a value of the previous authentication code in response to no previous authentication code being stored.

16. The method of claim 15, wherein the message is a context transfer request from a network entity of a target system to which the mobile device has entered, further comprising:
transferring a requested context to the network entity in response to successful verification of the authentication code.

17. The method of claim 15, wherein the message is one of a relocation complete message, a forward relocation complete message, or a handover notify message.

18. The method of claim 15, wherein the generated authentication code is a non-access stratum token derived from a previous non-access stratum token and a user equipment specific non-access stratum key of an evolved 3GPP system.

19. An apparatus comprising:
a generator configured to generate an authentication code on the basis of a previous authentication code retrieved from a memory,
a storage to store the generated authentication code or an input parameter used to generate the generated authentication code for subsequent authentication code generation event, and
a transmitter to transmit a control message comprising the generated authentication code from a mobile device to a first network entity in response to change of an access network for the mobile device;
wherein the apparatus is configured to pad a value of the previous authentication code in response to no previous authentication code being stored.

20. The apparatus of claim 19, wherein the authentication code is a non-access stratum token derived from a previous non-access stratum token and a user equipment specific key.

21. The apparatus of claim 19, wherein the apparatus is configured to generate the authentication code by applying a key definition function to a previous non-access stratum token and an access security management key.

22. The apparatus of claim 19, wherein the apparatus is a user equipment device configured to transmit the generated authentication code in a control message to an evolved Universal Terrestrial Radio Access Network (E-UTRAN), UTRAN, or GSM/EDGE radio access network (GERAN).

23. The apparatus of claim 19, wherein the apparatus is configured to transmit the generated authentication code in a location update request message, a tracking area update request message or a routing area update request message.

24. The apparatus of claim 19, wherein the apparatus is configured to transmit the generated authentication code in a packet switched network temporary mobile station identifier (P-TMSI) signature information field.

25. The apparatus of claim 19, wherein the apparatus is configured to transmit the generated authentication code in a handover complete or confirmation message.

26. The apparatus of claim 19, wherein the apparatus is a chipset for a mobile communications device.

27. An apparatus comprising:
a generator configured to generate an authentication code on the basis of a previous authentication code retrieved from a memory,
a storage to store the generated authentication code for subsequent authentication code generation event, and
an authenticator configured to use the generated authentication code when authenticating or authorizing a received control message including an authentication code from a mobile device in response to an access network change for the mobile device
wherein the apparatus is configured to pad a value of the previous authentication code in response to no previous authentication code being stored.

28. The apparatus of claim 27, wherein the generated authentication code is a non-access stratum token derived from a previous non-access stratum token and a user equipment specific key.

29. The apparatus of claim 27, wherein the apparatus is configured to derive the generated authentication code by applying a key definition function to a previous non-access stratum token and an access security management key.

30. The apparatus of claim 27, wherein the apparatus is configured to function as a mobility management entity MME of an evolved 3GPP system.

31. The apparatus of claim 27, wherein the received control message is one of a relocation complete message, a forward relocation complete message, or a handover notify message.

32. A computer readable storage medium encoding a computer process for authentication code generation control in a communications device, the computer process comprising:
generating an authentication code on the basis of a previous authentication code stored in connection with a preceding authentication code generation event,
storing the generated authentication code for subsequent authentication code generation event, and
transmitting a control message comprising the authentication code from a mobile device to a first network entity in response to an access network change for the mobile device, for verifying the authentication code by the first network entity or by a second network entity of a previous access system;
further comprising padding a value of the previous authentication code in response to no previous authentication code being stored.

33. A computer readable storage medium of claim 32, wherein the authentication code is a non-access stratum token derived from a previous non-access stratum token and a user equipment specific key.

34. A computer readable storage medium encoding a computer process for authentication code generation control in a communications device, the computer process comprising:
generating an authentication code on the basis of a previous authentication code stored
in connection with a preceding authentication code generation event,
storing the generated authentication code for subsequent authentication code generation event, and
using the generated authentication code when authenticating or authorizing a received control message including an authentication code from a mobile device in response to an access network change for the mobile device;
further comprising padding a value of the previous authentication code in response to no previous authentication code being stored.

35. The computer readable storage medium of claim 34, wherein the generated authentication code is a non-access stratum token derived from a previous non-access stratum token and a user equipment specific key.

36. An apparatus comprising:

means for generating an authentication code on the basis of a previous authentication code retrieved from the memory, means for storing the generated authentication code for subsequent authentication code generation event, means for transmitting a control message comprising the authentication code from a mobile device to a network entity in response to change of the mobile device to an access network of the network entity; and means for padding a value of the previous authentication code in response to no previous authentication code being stored.

37. The apparatus of claim 36, wherein the authentication code is a non-access stratum token derived from a previous non-access stratum token and a user equipment specific key.

* * * * *